（12）United States Patent
Hattori

(10) Patent No.: US 12,159,064 B2
(45) Date of Patent: Dec. 3, 2024

(54) PRINTING DEVICE DISPLAYING TYPE-IDENTIFICATION INFORMATION IDENTIFYING CONSUMABLE

(71) Applicant: BROTHER KOGYO KABUSHIKI KAISHA, Nagoya (JP)

(72) Inventor: Yuka Hattori, Mizuho (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/179,526

(22) Filed: Mar. 7, 2023

(65) Prior Publication Data

US 2023/0280946 A1  Sep. 7, 2023

Related U.S. Application Data

(63) Continuation of application No. 17/479,124, filed on Sep. 20, 2021, now Pat. No. 11,625,202.

(30) Foreign Application Priority Data

Sep. 30, 2020 (JP) .................................. 2020-165326

(51) Int. Cl.
*G06F 3/12* (2006.01)

(52) U.S. Cl.
CPC .......... *G06F 3/1204* (2013.01); *G06F 3/1219* (2013.01); *G06F 3/1255* (2013.01)

(58) Field of Classification Search
None
See application file for complete search history.

(56) References Cited

U.S. PATENT DOCUMENTS

| | | | |
|---|---|---|---|
| 10,782,632 B1 | 9/2020 | Aoki | |
| 2005/0068351 A1 | 3/2005 | Katayama | |
| 2006/0071952 A1* | 4/2006 | Motominami | ............. B41J 3/46 347/5 |

(Continued)

FOREIGN PATENT DOCUMENTS

| | | | |
|---|---|---|---|
| JP | 2006116956 A | 5/2006 | |
| JP | 2006-199041 A | 8/2006 | |

(Continued)

OTHER PUBLICATIONS

Office Action dated Jun. 21, 2022 received in U.S. Appl. No. 17/479,124.

(Continued)

*Primary Examiner* — Frantz Bataille
(74) *Attorney, Agent, or Firm* — Scully, Scott, Murphy & Presser, P.C.

(57) ABSTRACT

A printing device includes a mount portion, a printer, a display, and a controller. In the mount portion, a consumable is capable of being mounted. The printer is configured to print an image on a printing medium by using the consumable mounted on the mount portion. The controller performs a first display process to display on the display first type-identification information identifying a first consumable. The controller performs, in a case that a prescribed agreement for a subscription is established, a second display process to display on the display second type-identification information identifying a second consumable supported under the prescribed agreement.

20 Claims, 11 Drawing Sheets

(56) References Cited

U.S. PATENT DOCUMENTS

2017/0090830 A1* 3/2017 Tomono ................ G06F 3/1235
2020/0094568 A1  3/2020 Koganehira

FOREIGN PATENT DOCUMENTS

JP   2017177777 A   10/2017
JP   2020044754 A    3/2020

OTHER PUBLICATIONS

Notice of Allowance dated Dec. 7, 2022 received in U.S. Appl. No. 17/479,124.
Notice of Reasons for Refusal dated Dec. 15, 2023 received in Japanese Patent Application No. JP 2020-165326.

* cited by examiner

INK ICON →

INK CARTRIDGE MODEL →

PRINTING DEVICE DISPLAYING TYPE-IDENTIFICATION INFORMATION IDENTIFYING CONSUMABLE

REFERENCE TO RELATED APPLICATIONS

This application is a continuation of U.S. patent application Ser. No. 17/479,124, filed Sep. 20, 2021, which claims priority from Japanese Patent Application No. 2020-165326 filed Sep. 30, 2020. The entire contents of the aforementioned applications are incorporated herein by reference.

BACKGROUND ART

Technical Field

The present disclosure relates to a printing device to print an image on a printing medium, an image formation program, and a display program.

Background

A well-known printing devices that use ink cartridges notifies the user of the model numbers of ink cartridges that are compatible with the printing device by printing the model numbers when the residual ink quantity of an ink cartridge falls below a prescribed value.

DESCRIPTION

Summary

To help the user prepare for cases in which ink cartridges currently mounted in a printing device run out of ink, a conventional printing device searches for the model numbers for the next ink cartridges to be mounted in and used on the printing device and prints these model numbers on an order form. This process makes it more convenient for the user to purchase more ink cartridges when needed.

However, in recent years the users of such printing devices may enter a predefined agreement with a service provider to use a printing device that the service provider owns. Under the agreement, the user pays the service provider a fee based on printing content. Upon entering such an agreement, the user must employ cartridges of a different type from the normal cartridges used when an agreement has not been established. Since the conventional technology does not account for such situations, the user could mistakenly mount the normally used cartridges reported by the printing device after entering the above agreement.

Another possibility is that the user could enter a plurality of agreements having formats different from the format described above, wherein each agreement uses cartridges of a different type. The problem of the prior art described above also applies to this scenario.

In view of the foregoing, it is an object of the present disclosure to provide a printing device, an image formation program, and display program that can prevent the user from mounting the wrong consumables in the printing device after the user has entered an agreement.

In order to attain the above and other objects, the disclosure provides a printing device. The printing device includes a mount portion, a printer, a display, and a controller. In the mount portion, a consumable is capable of being mounted. The printer is configured to print an image on a printing medium by using the consumable mounted on the mount portion. The controller is configured to perform: a first display process to display on the display first type-identification information identifying a first consumable; and in a case that a prescribed agreement for a subscription is established, a second display process to display on the display second type-identification information identifying a second consumable supported under the prescribed agreement.

According to another aspect, the disclosure provides a non-transitory computer readable storage medium storing a set of program instructions installed on and executed by a computer included in a printing device. The printing device further includes: a mount portion in which a consumable is capable of being mounted; a printer configured to print an image on a printing medium by using the consumable mounted on the mount portion; and a display. The set of program instructions includes: a first display process to display on the display first type-identification information identifying a first consumable; and in a case that a prescribed agreement for a subscription is established, a second display process to display on the display second type-identification information identifying a second consumable supported under the prescribed agreement.

According to still another aspect, the disclosure provides a non-transitory computer readable storage medium storing a set of program instructions installed on and executed by a computer included in a terminal configured to be connected to a printing device. The printing device is configured to print an image on a printing medium by using a consumable. The set of program instructions includes: a first display process to display first type-identification information identifying a first consumable; and in a case that a prescribed agreement for a subscription is established, a second display process to display second type-identification information identifying a second consumable supported under the prescribed agreement.

BRIEF DESCRIPTION OF THE DRAWINGS

The particular features and advantages of the disclosure as well as other objects will become apparent from the following description taken in connection with the accompanying drawings, in which.

DETAILED DESCRIPTION

Figure 1:
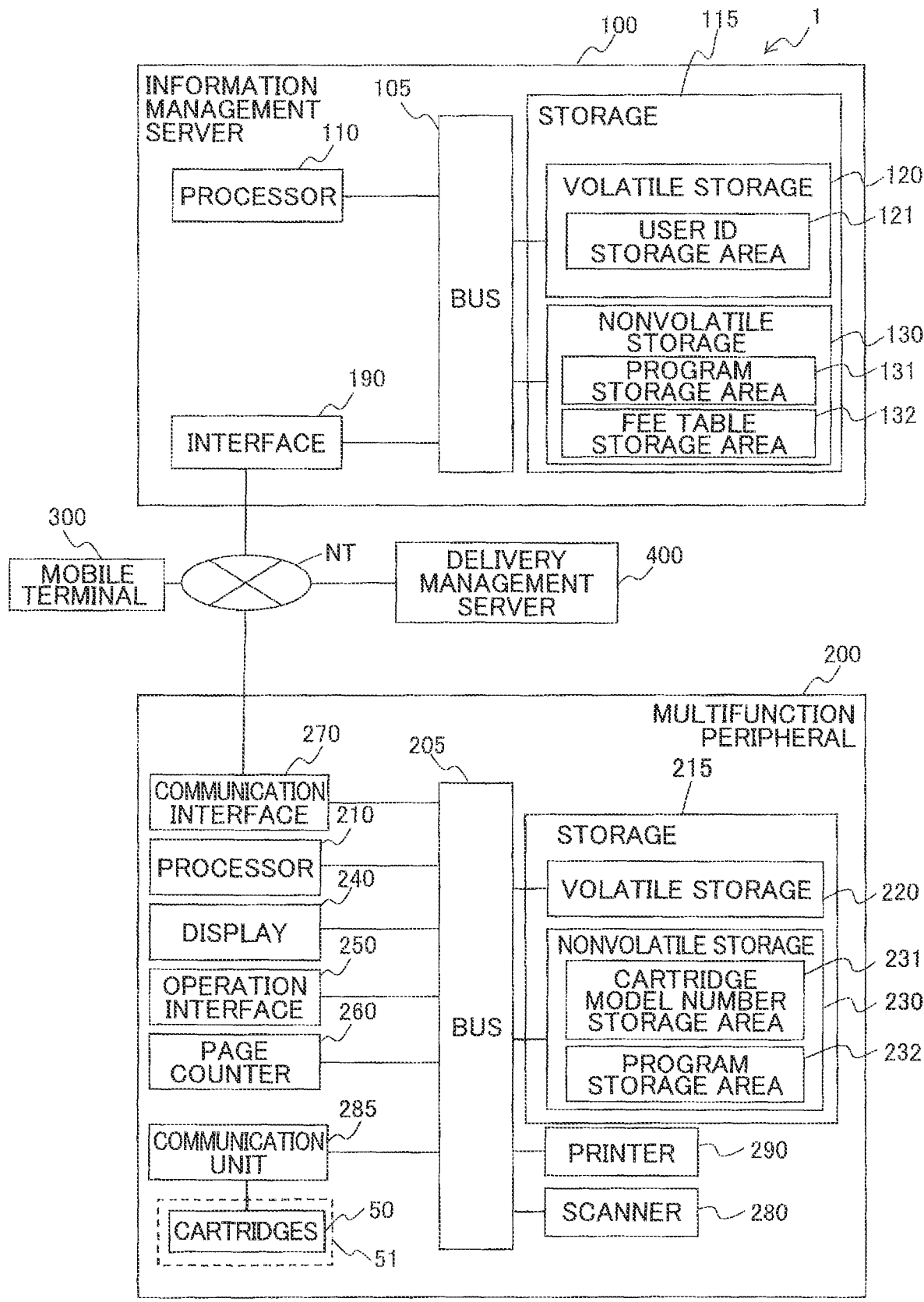
FIG. 1 is a block diagram illustrating overall structures of a printing system according to an embodiment.

FIG. 1 shows a printing system according to an embodiment of the present disclosure. In the embodiment, a printing system 1 can provide a printing service to users, i.e., customers. Through this service, the user pays a fee to use the printing function of a multifunction peripheral 200. Specifically, the user enters a printing agreement whereby a fee is charged based on the number of pages printed within a specific interval.

Overview of the Printing System

As shown in FIG. 1, the printing system 1 includes an information management server 100, the multifunction peripheral 200, a mobile terminal 300, and a delivery management server 400. The information management server 100, the multifunction peripheral 200, the mobile terminal 300, and the delivery management server 400 are interconnected over a network NT and are capable of communicating with each other. The multifunction peripheral 200 is an example of the printing device.

Information Management Server

The information management server 100 is installed and managed by the manufacturer of the multifunction peripheral 200, for example. The information management server 100 has a processor 110, a storage 115, and an interface 190. The processor 110, the storage 115, and the interface 190 are interconnected via a bus 105.

The storage 115 is provided with a volatile storage 120, and a nonvolatile storage 130. The volatile storage 120 is DRAM, for example, and has a user ID storage area 121. The volatile storage 120 saves a subscription page count received from the multifunction peripheral 200. The nonvolatile storage 130 is a hard disk drive or solid-state drive, for example. The nonvolatile storage 130 has a program storage area 131, and a fee table storage area 132.

The fee table storage area 132 stores prescribed correlations for calculating fees to be charged to the user based on printing. These correlations indicate the rates per page count based on printing coverage, paper size, and whether printing was performed in color or monochrome, for example.

The processor 110 is a device that performs data processing, such as a CPU. By executing a program stored in the program storage area 131, the processor 110 implements various processes, such as those in FIGS. 2, and 7 described later, including a process for performing data communications with the mobile terminal 300, the multifunction peripheral 200, and the delivery management server 400 connected to the network NT.

The interface 190 is a wired LAN interface or wireless interface for communicating with other devices. The interface 190 is connected to the network NT.

Delivery Management Server

The delivery management server 400 is installed at a company providing a delivery service for delivering various articles, for example. Although not shown in the drawings, the delivery management server 400 has a processor, a storage, and an interface for connecting to the network NT.

Multifunction Peripheral

The multifunction peripheral 200 may be a printer, a facsimile machine, or the like that the service provider owns, for example. The service provider may lend the multifunction peripheral 200 to the user, and the user installs the multifunction peripheral 200 at home. The multifunction peripheral 200 has a scanner 280, a printer 290, a processor 210, a storage 215, a display 240, an operation interface 250, a page counter 260, a communication unit 285, and a communication interface 270. The scanner 280, the printer 290, the processor 210, the storage 215, the display 240, the operation interface 250, the page counter 260, the communication unit 285, and the communication interface 270 are connected to each other via a bus 205.

The storage 215 includes a volatile storage 220, and a nonvolatile storage 230. The volatile storage 220 is DRAM, for example. The nonvolatile storage 230 is flash memory, for example. The nonvolatile storage 230 is provided with a cartridge model number storage area 231 and a program storage area 232. The program storage area 232 stores various programs including the printing program according to the embodiment for executing the sequence steps in FIGS. 2, 5, 7, 9, and etc. described later. The printing program is prestored in the nonvolatile storage 230 as firmware, for example. The cartridge model number storage area 231 will be described later.

The processor 210 is a device such as a CPU that performs data processing. The processor 210 is an example of the controller. The processor 210 executes the printing program stored in the program storage area 232 and, in cooperation with the processor 110, implements a printing method according to the printing system 1 of the embodiment.

The display 240 is a liquid crystal display, for example. The operation interface 250 is a device that receives user operations. By operating the operation interface 250, the user can input various instructions into the multifunction peripheral 200. The communication interface 270 is a wired or wireless network interface for communicating with other devices. The communication interface 270 is connected to the network NT.

The scanner 280 optically reads an original or other object using photoelectric conversion elements such as a CCD or CMOS and generates scan data representing the read image.

The printer 290 feeds a sheet of paper from a paper tray and conveys the sheet with a conveying mechanism (not shown) while printing an image on the conveyed sheet according to a prescribed method. A case in which an inkjet system is used for printing will be taken up in the following description. Hence, the printer 290 forms images on paper using ink stored in ink cartridges 50 that are detachably mounted in a cartridge holder 51. The printer 290 is an example of an image formation portion; the paper is an example of the printing medium; the ink cartridges 50 are an example of the consumables; the cartridge holder 51 is an example of the mount portion; and the ink is an example of the consumable. More specifically, the ink cartridges 50 include a cyan ink cartridge a magenta ink cartridge, a yellow ink cartridge, and a black ink cartridge. However, when no distinction is being made, the cartridges will simply be called "ink cartridges 50" in the following description for convenience.

The communication unit 285 is a terminal, for example, that is electrically connected to a cartridge memory (a chip) possessed by each ink cartridge 50 mounted in the cartridge holder 51. As described above, the multifunction peripheral 200 of the embodiment can be used in a printing service offered under a prescribed printing agreement. An ink cartridge 50 that is used based on such an agreement (hereinafter simply referred to as a "subscription cartridge 50") has different specifications from an ordinary ink cartridge 50 purchased for use in the multifunction peripheral 200 by the owner of the multifunction peripheral 200, for example (hereinafter simply referred to as a "normal cartridge 50"). For this reason, each ink cartridge 50 is provided with a cartridge memory (not shown) for storing cartridge information. The cartridge information includes cartridge type information indicating whether the ink cartridge 50 is a subscription cartridge 50 or a normal cartridge 50. The processor 210 acquires this cartridge information from the cartridge memory of each ink cartridge 50 via the communication unit 285. Based on the acquired cartridge information, the processor 210 can identify whether each ink cartridge 50 mounted in the cartridge holder 51 is a subscription cartridge 50 or a normal cartridge 50.

Type-identification information (or, identification information, type information) for ink cartridges 50 to be mounted in the cartridge holder 51 can be displayed on the touchscreen 240 in response to a prescribed operation on the operation interface 250, excluding certain exceptions described later in which the processor 210 performs processes to hide a display of the type-identification information, for example. In the embodiment, the type-identification information is the model numbers of the ink cartridges 50. Accordingly, the operability of the multifunction peripheral 200 can be improved when the user attaches the cartridges 50 to the cartridge holder 51. When the multifunction peripheral 200 is manufactured and shipped, the display for the touchscreen 240 is configured in a default format aimed at general users. In this default format, the model numbers of normal cartridges 50 supported by the multifunction peripheral 200 are displayed on the touchscreen 240. For this purpose, the cartridge model number storage area 231 pre-stores model numbers for normal cartridges 50 and model numbers for subscription cartridges 50 that are compatible with the multifunction peripheral 200, i.e., that can be mounted in the cartridge holder 51 and that can be used by the printer 290 to execute image formation. Note that these model numbers for normal cartridges 50 and subscription cartridges 50 may be alternatively stored in the nonvolatile storage device 130 of the information management server 100 or a storage device in the information terminal 300 described later and may subsequently be read from the storage device to be acquired by the multifunction peripheral 200. A more detailed description of how these model numbers for ink cartridges 50 are displayed on the touchscreen 240 according to the embodiment will be described later.

The page counter 260 has a function for incrementing or counting up a cumulative value of a printing count when the printer 290 executes a print under control of the processor 210. The printing count is more specifically the number of printed pages. For example, the page counter 260 counts one page every time the printer 290 prints one side of a single sheet of paper and counts two pages every time the printer 290 prints on both sides of a sheet. This page count is set to zero when the multifunction peripheral 200 is manufactured and shipped, for example, and thereafter is incremented without exception each time a print is performed. By controlling the page counter 260 to count pages and acquiring this page count from the page counter 260, the processor 210 can perform various processes described later.

Mobile Terminal

The mobile terminal 300 is an information terminal such as a smartphone or other mobile device possessed by the user. The mobile terminal 300 is connected to the network NT through wireless communications. While not shown in the drawings, the mobile terminal 300 has a processor, a storage, and an interface for connecting to the network NT. The storage of the mobile terminal 300 includes a program storage area for storing various programs such as a display program concerning execution of the sequence charts shown in FIGS. 2 and 7. Alternatively, another information terminal such as a personal computer or a tablet computer may be used in place of the mobile terminal 300. In the following description, the information terminal such as the mobile terminal 300 or the personal computer will be generally called the "information terminal 300." The information terminal 300 is an example of the external display device.

Feature of the Embodiment

One feature of the printing system 1 according to the embodiment having the above configuration is displayed contents of model numbers of the ink cartridges 50.

That is, in a case that a printing agreement has been established as described above, the user must mount subscription cartridges 50 in the cartridge holder 51 rather than the normal cartridges 50 that are commonly used when no agreement has been established. Thus, in a conceivable case that the model numbers for normal cartridges 50 are left displayed on the touchscreen 240 as described above after the user has entered an agreement, the user may mistakenly mount normal cartridges 50 in the cartridge holder 51.

Process Flow

Therefore, the embodiment provides a control procedure for resolving this problem. The control procedure represents processes executed by the processor 210 of the multifunction peripheral 200, the processor 110 of the information management server 100, the processor of the delivery management server 400, and the processor of the information terminal 300. This control procedure will be described next with reference to the sequence chart of FIG. 2. In the following descriptions for FIG. 2 and other drawings, the processors have been omitted from the descriptions. Hence, expressions such as "the processor of the multifunction peripheral 200 executes" or "by the processor of the multifunction peripheral 200" have been simplified to "the multifunction peripheral 200 executes" and "by the multifunction peripheral 200."

Figure 2:
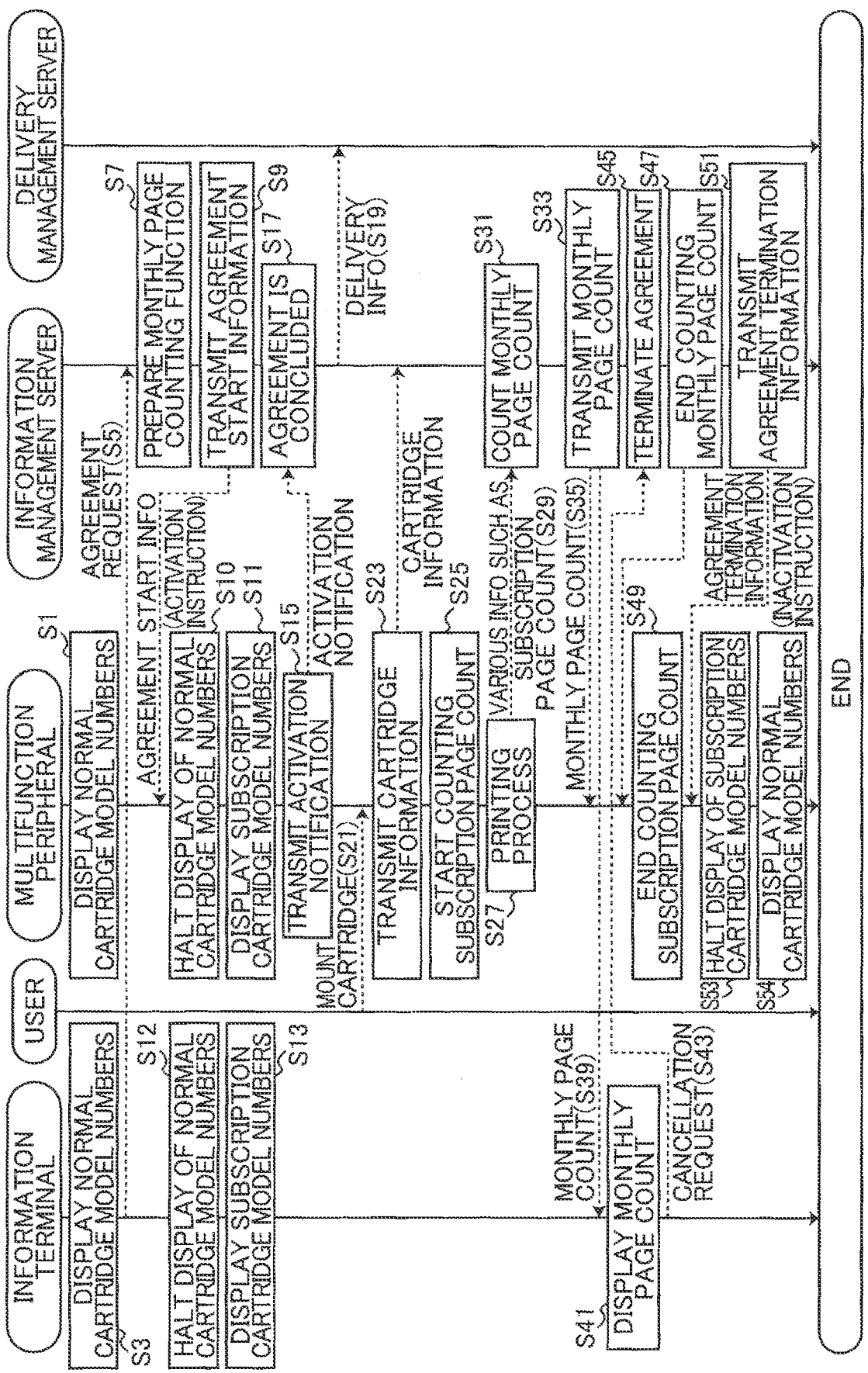
FIG. 2 is a sequence chart illustrating processes executed by an information terminal, a multifunction peripheral, an information management server, and a delivery management server.

In S1 of FIG. 2, the user performs a prescribed operation on the operation interface 250 of the multifunction peripheral 200 to display the model numbers of the normal cartridges 50 compatible with the multifunction peripheral 200 on the display 240 based on the contents stored in the cartridge model number storage area 231. Here, S1 is an example of the first display step executed by the controller, and the process executed in S1 is an example of the first display process. Here, it will be assumed that the user has not yet entered a printing agreement (described later) at this time and that either normal ink cartridges 50 or no ink cartridges 50 are currently mounted in the cartridge holder 51. An example of the display content on the display 240 at this time will be described next with reference to FIGS. 3A-3D.

Figure 3A:
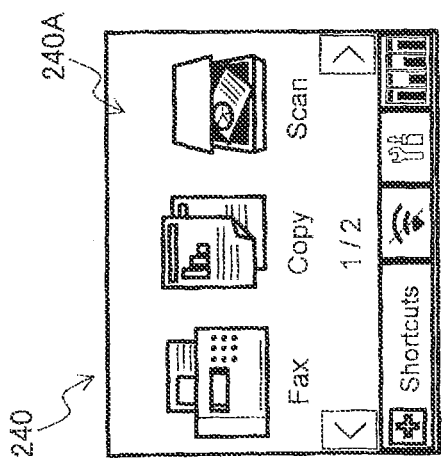
FIG. 3A-3D are explanatory diagrams illustrating operations and transition to display model numbers of normal cartridges on a display in the multifunction peripheral.

Sample Display of the Model Numbers of Normal Cartridges on the Multifunction Peripheral The display 240 shown in FIGS. 3A-3D has a touchscreen that also function as the operation interface 250. Accordingly, the display 240 cam be called the "touchscreen 240". FIG. 3A shows an initial screen 240A displayed on the touchscreen 240. The initial screen 240A includes icons representing a menu of various operations including "Fax," "Copy," and "Scan". When the screen is scrolled by operation of an arrow button show in the display 240, a menu "Ink" ("Ink" icon) is displayed on the display 240. In this case, when the user selects the "Ink" icon, a settings screen 240B shown in FIG. 3B can be displayed on the display 240.

The settings screen 240B includes buttons displaying items for which settings are configurable. These items are "Ink Volume," "Ink Cartridge", and "Improve Print Quality." By operating the "Ink Cartridge" button in the settings screen 240B, the user can display a model number display screen 240C shown in FIG. 3C.

The model number display screen 240C includes the item name "Ink Cartridge Model," and model numbers for normal cartridges 50 that are compatible with this multifunction peripheral 200. In the embodiment, the model numbers displayed for each ink color are "LC401BKS" for black ink, "LC401CS" for cyan ink, "LC401MS" for magenta ink, and "LC401YS" for yellow ink. A "Print" button and a "Back" button are also displayed in the bottom of the model number display screen 240C.

Figure 3B:
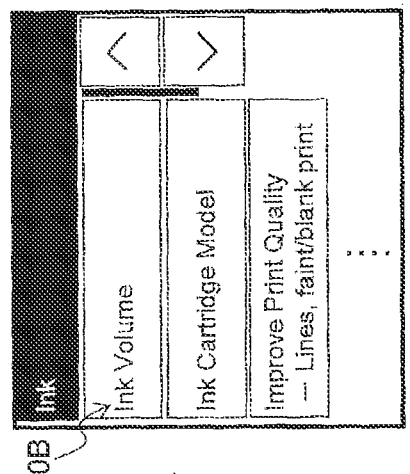

When the user operates the "Print" button at this time, the processor 210 controls the printer 290 to print on a paper the content with respect to the model numbers of the normal cartridges 50 which is displayed on the display 240. Hence, the model numbers "LC401BKS," "LC401CS," "LC401MS," and "LC401YS" for black ink, cyan ink, magenta ink, and yellow ink, respectively, are printed on a sheet PA, as illustrated in FIG. 3D. The operation of this "Print" button is an example of the prescribed operation, and the process executed by the processor 210 when the prescribed operation is performed is an example of the first printing process.

Displaying Normal Cartridge Model Numbers on the Information Terminal

Returning to FIG. 2, in S3 the information terminal 300 acquires these same model numbers for black ink, cyan ink, magenta ink, and yellow ink from the multifunction peripheral 200 when the user performs a prescribed operation on the operation interface 250 and displays these model numbers (not shown) in conjunction with the process in S1. Step S3 is an example of the first display step executed by the information terminal 300.

Information including the model numbers is displayed on the information terminal 300 according to a web page file of a prescribed format accessed through a prescribed URL, such as a file for an embedded web server (EWS). The web page file accessed through the prescribed URL is generated and managed by the multifunction peripheral 200. For example, the multifunction peripheral 200 transmits the web page file to the information terminal 300 in response to a request from the information terminal 300. The user performs a suitable operation on the information terminal 300 to access this URL, whereby in S3 the multifunction peripheral 200 outputs the web page file for the EWS to a browser on the information terminal 300. As a result, a web page which describes various information including the normal cartridge model numbers for the normal cartridges 50 is displayed on the information terminal 300.

The model numbers for the normal cartridges 50 are displayed on the information terminal 300 through a web page file for the EWS, but the present invention is not limited to this configuration. For example, the user may access from the information terminal 300 a personalized web page based on user specific information that was previously associated with the user in the information management server 100 to display the user's personalized web page (not shown). Here, the personalized web page includes information similar to the example described above.

Establishing a Printing Agreement

Returning to FIG. 2, after the processes in S1 and S3 have been completed as described above, the user performs a prescribed operation on the information terminal 300 indicating an intention to use the multifunction peripheral 200 under the printing agreement described above. In response to this operation, in S5 the information terminal 300 transmits an agreement request to the information management server 100, and thus the information management server 100 receives the agreement request.

In response, in S7 the information management server 100 prepares a monthly page counting function based on the page count held by the page counter 260 in the multifunction peripheral 200. This monthly page counting function counts only pages properly printed according to the printing agreement from among the number of pages counted by the page counter 260 during every specific interval after the printing agreement has been established. In the embodiment, the specific interval is one month, and the number of pages printed for each month (hereinafter simply called the "monthly page count") is counted as an example of the printing count for the specific interval. The monthly page counting function is provided in the information management server 100 in association with the user ID corresponding to the information terminal 300.

In S9 the information management server 100 transmits agreement start information (i.e., an activation instruction) to the multifunction peripheral 200, and the multifunction peripheral 200 receives this activation instruction. Through this action, the printing agreement described above is now established. The agreement start information is an example of the printing agreement completion notification.

Displaying Subscription Cartridge Model Numbers on the Multifunction Peripheral

In response to the agreement being established, in S10 the multifunction peripheral 200 under control of the processor 210 halts the display of model numbers for normal cartridges 50 that was initiated in S1. In other words, the multifunction peripheral 200 no longer displays the model numbers for the normal cartridges 50, or the multifunction peripheral 200 does not permit display of the model numbers for the normal cartridges 50. In S11 the multifunction peripheral 200 begins displaying on the display 240 model numbers for subscription cartridges 50 compatible with the multifunction peripheral 200 based on content stored in the cartridge model number storage area 231. In other words, the multifunction peripheral 200 permits display of the model numbers for the subscription cartridges 50. Here, the subscription cartridges 50 are an example of the specific consumables, and the model numbers of the subscription cartridges 50 are an example of the second type-identification information. Further, step S11 is an example of the second display step executed by the multifunction peripheral 200, and the process executed by the processor 210 in S11 is an example of the second display process.

Sample Display for Subscription Cartridge Model Numbers on the Multifunction Peripheral The following is a specific example of the sequence of displays performed in S11. The sequence of displays on the display 240 of the multifunction peripheral 200 will be described with reference to FIGS. 4A-4C, which correspond to FIGS. 3A-3C described above. The model number display screen 240C shown in FIG. 4C is displayed on the display 240 after the user operates the "Ink" icon in the initial screen 240A and operates the "Ink Cartridge Model" button in the subsequent settings screen 240B, as shown in FIGS. 4A and 4B, which are identical to FIGS. 3A and 3B. The model number display screen 240C in FIG. 4C differs from that in FIG. 3C in that the model numbers are displayed for subscription cartridges 50 compatible with the multifunction peripheral 200. In the embodiment, the model numbers displayed for ink colors are "LC401BKR" for black ink, "LC401CR" for cyan ink, "LC401MR" for magenta ink, and "LC401YR" for yellow ink. Note that only the "Back" button is displayed in the bottom of the model number display screen 240C in FIG. 4C. The "Print" button is not displayed on the display screen 240C, thereby preventing the user from performing an operation to print the displayed content of model numbers. In other words, even if the user were to attempt to print model numbers for ink cartridges 50 on a sheet PA, as described above, the multifunction peripheral 200 would receive no such command. The process performed by the processor 210 to stop displaying the "Print" button is an example of the reception suspension process. However, rather than stopping the display of the "Print" button, the processor 210 may instead display the "Print" button but prevent the button from being operated or may hide the "Print" button by graying out the button in the display, for example.

Displaying Subscription Cartridge Model Numbers on the Information Terminal

Returning to FIG. 2, in conjunction with the process in S11 and in response to the agreement being established, in S12 the information terminal 300 also halts the display of model numbers for normal cartridges 50 that was initiated in S3. That is, the information terminal 300 no longer displays these model numbers. In S13 the information terminal 300 also begins displaying the model numbers for subscription cartridges 50 that are compatible with the multifunction peripheral 200. Similarly to S3, the information terminal 300 acquires the model numbers for subscription cartridges from the multifunction peripheral 200 via a file for the EWS when the user performs a prescribed operation on the operation interface 250.

In S15 the multifunction peripheral 200 transmits an agreement acceptance notification (i.e., an activation notification) to the information management server 100, and in S17 the information management server 100 receives this activation notification. Here, the information management server 100 may issue a query to the multifunction peripheral 200, and the multifunction peripheral 200 may transmit the activation notification in response. In this way, the information management server 100 recognizes that the printing agreement described above has been concluded. Thereafter, the multifunction peripheral 200 establishes communications with the information management server 100 to periodically exchange information related to the service. In the embodiment, the information management server 100 manages information necessary for the service according to the agreement by communicating with the multifunction peripheral 200 and exchanging information every 12 hours. In S19 the information management server 100 transmits delivery information to the delivery management server 400 for delivering subscription ink cartridge(s) 50 to the user. Through this process, the company providing a delivery service ships subscription ink cartridge(s) 50 to the user. Since the subscription cartridges 50 are used to perform printing processes on the multifunction peripheral 200 according to S27 described later, the multifunction peripheral 200 uses a well-known method to detect whether ink in the subscription cartridges 50 has been depleted or is getting low. The information management server 100 follows the reduction in residual ink quantities through the periodic communications described above. When the information management server 100 grasps that the residual ink quantity (or quantities) for an ink cartridge(s) 50 becomes (or become) low, the information management server 100 transmits delivery information to the delivery management server 400 for delivering additional ink cartridge(s) 50 to the user, as in S19 described above. In this way, the user can simply use the multifunction peripheral 200 without having to worry about managing residual ink quantities in the ink cartridges 50.

After the user receives subscription cartridge(s) 50 that was (or were) shipped as described above, in S21 the user mounts the subscription cartridge(s) 50 in the cartridge holder 51 of the multifunction peripheral 200 while checking the display 240 controlled from the process of S11. At this time, the communication unit 285 acquires cartridge information for the mounted ink cartridge(s) 50. In S23 the multifunction peripheral 200 transmits the acquired cartridge information to the information management server 100. In response, the information management server 100 receives the transmitted cartridge information.

In S25 the multifunction peripheral 200 starts counting with a subscription counting function based on the page count kept by the page counter 260. This subscription counting function counts only the number of pages that are printed properly in accordance with the printing agreement from among all pages counted by the page counter 260 after the printing agreement was established. For example, the subscription counting function excludes counts of pages printed when performing a test print, when only a single side of the sheet could be printed under an agreement for duplex printing, and when misprints occur due to an issue on the multifunction peripheral 200, such as a sheet conveying problem. Hereinafter, the number of printed pages counted by this subscription counting function will be called the "subscription page count."

In S27 the printer 290 executes a printing process on the multifunction peripheral 200. When the page counter 260 increments the page count at this time, the subscription page count is similarly incremented for pages that were printed properly in accordance with the printing agreement. In S29 the multifunction peripheral 200 transmits various information including the subscription page count to the information management server 100.

In S31 the information management server 100 uses the monthly page counting function prepared in S7 to count the monthly page count based on the subscription page count received from the multifunction peripheral 200. Next, counting of the monthly page count will be described in greater detail. As described above, the information management server 100 periodically communicates with the multifunction peripheral 200 to exchange information. In this example, the periodic cycle is every 12 hours. The information management server 100 saves in the volatile storage 120 the subscription page count received from the multifunction peripheral 200 every periodic communication. Further, the information management server 100 updates the monthly page count for every specific interval, which is one month in this example. Hence, the information management server 100 resets the monthly page count to zero every month. The information management server 100 compares the subscription page count received from the multifunction peripheral 200 via a periodic communication (communication of periodic cycle (12 hours)) after the monthly page count was reset with the subscription page count received from the multifunction peripheral 200 just prior to resetting the monthly page count, and stores this difference as the current monthly page count. The information management server 100 repeats this process until the end of the specific interval, i.e., throughout the one-month period. In this way, the user can be aware of the latest monthly page count, which is updated every 12 hours through the periodic communications. Thus, the monthly page count is the number of pages printed during the current month. While the specific interval is set to one month in the embodiment in order to display the number of pages printed based on a monthly fee, the specific interval may be two months or one week, for example. In other words, the period may be adjusted appropriately for the form of service being offered. Further, while the periodic communications for updating the monthly page count are performed every 12 hours in the embodiment, the periodic communications may be performed on another cycle, such as every other day. Alternatively, updating the subscription page count may be performed at an irregular timing, such as after every printing operation.

In S33 the information management server 100 transmits the monthly page count counted in S31 to the multifunction peripheral 200, and in S35 the multifunction peripheral 200 receives/acquires this monthly page count.

In S33 the information management server 100 also transmits the monthly page count found in S31 to the information terminal 300, and in S39 the information terminal 300 receives/acquires this monthly page count from the information management server 100. Instead of the information management server 100, the multifunction peripheral 200 may transfer the monthly page count from the information management server 100 to the information terminal 300. In S41 the information terminal 300 displays the monthly page count acquired from the information management server 100.

After having completed all desired printing, the user subsequently wishes to cancel the printing agreement described above, the user may perform a prescribed operation on the information terminal 300. In response to the user's operation, in S43 the information terminal 300 transmits a cancellation request to the information management server 100, and in S45 the information management server 100 receives this request. In S47 the information management server 100 ends counting of the monthly page count through the monthly page counting function initiated in S31 and notifies the multifunction peripheral 200 of this cancellation. In response, in S49 the multifunction peripheral 200 ends counting of the subscription page count according to the subscription counting function initiated in S25.

In S51 the information management server 100 then transmits agreement termination information (i.e., an inactivation instruction) to the multifunction peripheral 200, and the multifunction peripheral 200 receives this inactivation instruction. This agreement termination information is an example of the cancellation notification of the agreement. In response, in S53 the multifunction peripheral 200 halts the display of model numbers for subscription cartridges 50 that was initiated in S11 and in S54 resumes the display of model numbers for normal cartridges 50 that was halted in S10. Subsequently, the sequence of FIG. 2 ends. The processes of S53 and S54 are an example of the display resuming process.

Description of Display Control for the Multifunction Peripheral

When the display of information related to normal cartridges 50 or subscription cartridges 50 is executed or halted on the display 240 of the multifunction peripheral 200 as described above, the user viewing these displays may accidentally mount ink cartridges 50 that do not conform to the displayed content. To prepare for such cases, the multifunction peripheral 200 according to the embodiment displays a prescribed warning when incorrect cartridges are mounted. A control procedure executed by the processor 210 of the multifunction peripheral 200 to implement this method will be described with reference to the flowchart in FIG. 5.

Figure 5:
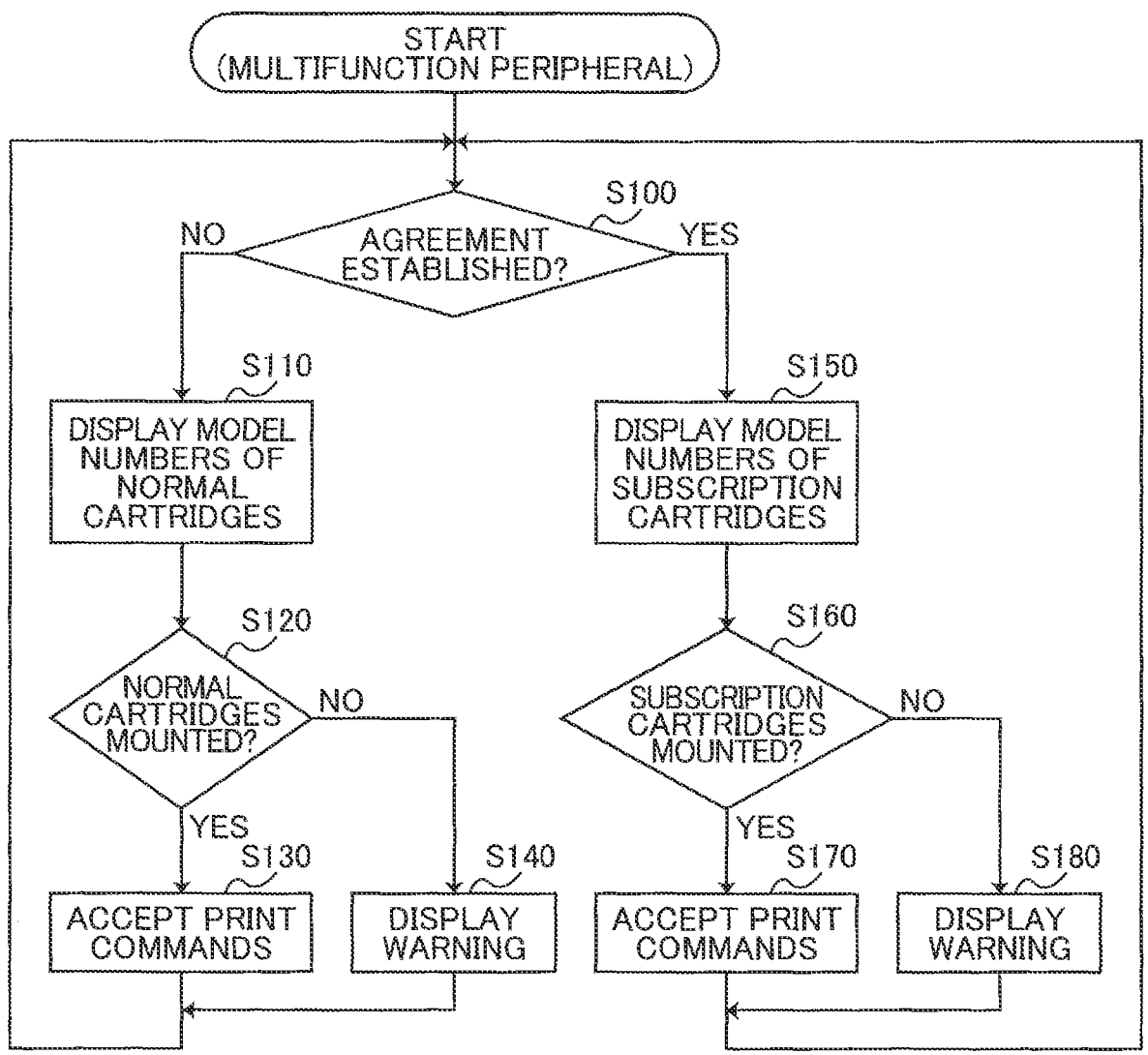
FIG. 5 is a flowchart illustrating display control executed by the multifunction peripheral.

In S100 at the beginning of FIG. 5, the processor 210 determines whether a printing agreement has been established. The processor 210 advances to S150 described later when a printing agreement has already been established (S100: YES) and advances to S110 when a printing agreement has not been established (S100: NO). The processor 210 also reaches a NO determination in S100 when a previously established agreement has been cancelled, as described in S51 of FIG. 2.

Figure 3C:
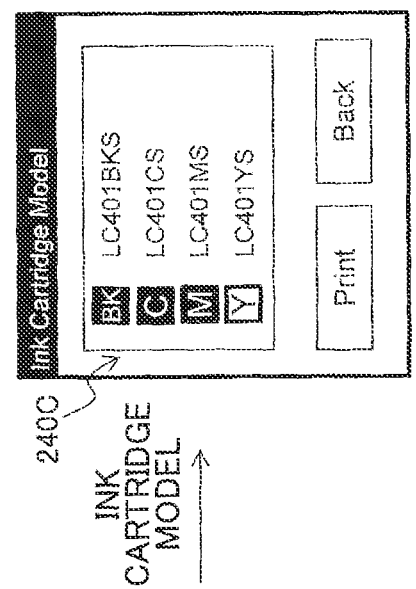
Figure 3D:
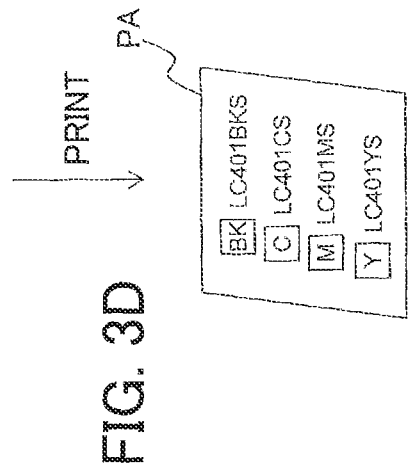
Figure 4C:
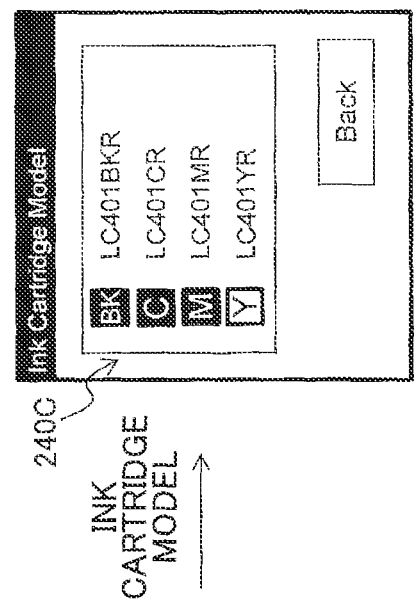
FIGS. 4A-4C are explanatory diagrams illustrating operations and transition to display model numbers of subscription cartridges on the display.
Figure 4B:
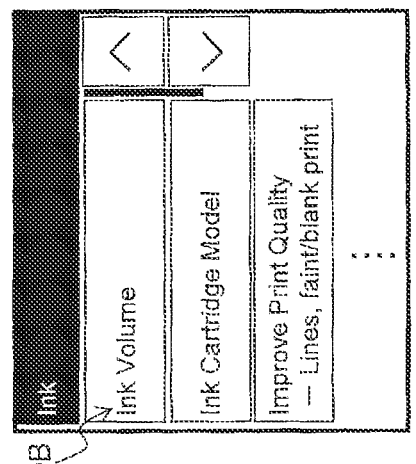
Figure 4A:
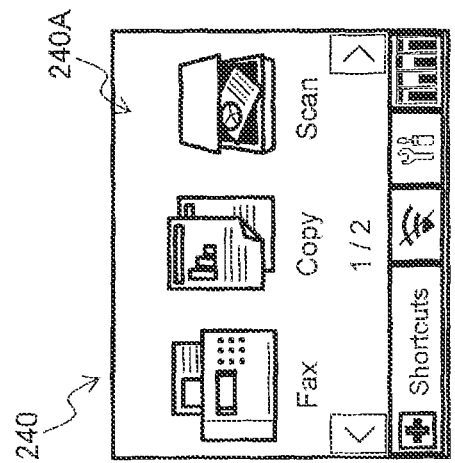

In S110 the processor 210 displays the model numbers of the normal cartridges 50 on the display 240 (see S1 of FIG. 2 and FIG. 3C). In S120 the processor 210 determines whether normal cartridges 50 are mounted in the cartridge holder 51 based on cartridge information acquired through the communication unit 285.

When normal cartridges 50 are currently mounted in the cartridge holder 51 (S120: YES), in S130 the processor 210 accepts print commands from the user through prescribed operations on the operation interface 250. In other words, the processor 210 allows image formation with the printer 290 using the normal cartridges 50 displayed in S110, enabling the user to execute desired printing with the printer 290 of the multifunction peripheral 200. After completing the process in S130, the processor 210 returns to S100 and repeats the above procedure.

When one or more non-normal cartridges 50 are currently mounted in the cartridge holder 51, that is, one or more subscription cartridges 50 or one or more other ink cartridges 50 that are not compatible with the multifunction peripheral 200 are currently mounted in the cartridge holder 51 (S120: NO), in S140 the processor 210 displays a prescribed warning on the display 240 indicating that at least one ink cartridge 50 mounted in the cartridge holder 51 does not match any one of the ink cartridges 50 whose model numbers were displayed in S110. Unlike in S130, in S140 the processor 210 does not accept print commands from the user through the prescribed operations on the operation interface 250 and does not allow image formation with the printer 290 using the subscription cartridges 50 currently mounted in the cartridge holder 51. In other words, the processor 210 prohibits image formation with the printer 290. An example of a warning displayed on the display 240 at this time is shown in FIG. 6.

Figure 6:
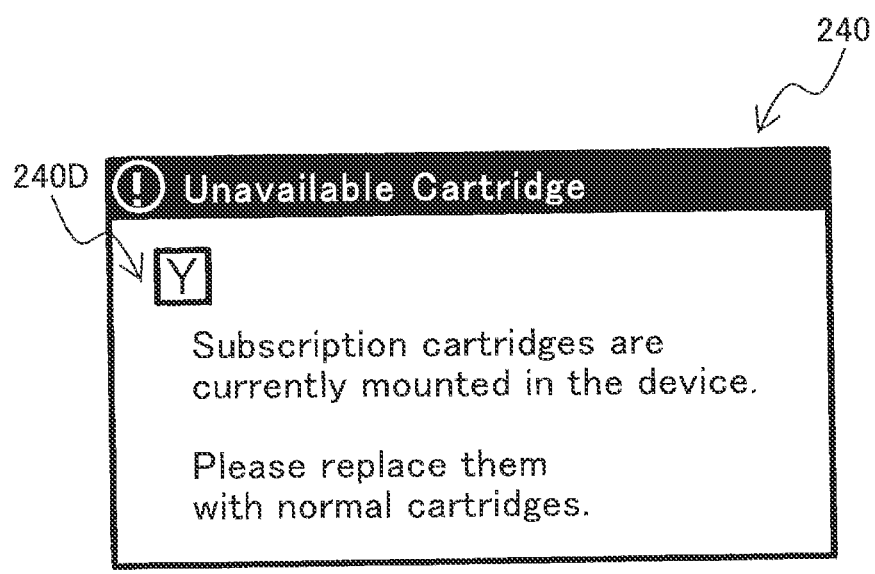
FIG. 6 is an explanatory diagram illustrating a warning displayed on the display.

The sample display according to the embodiment in FIG. 6 shows a warning related to the yellow ink cartridge 50. Specifically, the processor 210 displays a warning screen 240D on the display 240 with the message "Subscription cartridges are currently mounted in the device. Please replace them with normal cartridges." The warning screen 240D is displayed on the display 240 when ink cartridges 50 are mounted in the cartridge holder 51 and the cover that opens and closes over the cartridge holder 51 is closed. The warning screen 240D may also include the model numbers of acceptable cartridges. The process executed by the processor 210 in S140 corresponds to an example of the warning display process. After completing the process in S140, the processor 210 returns to S100 and repeats the above procedure.

On the other hand, when the processor 210 determines in S100 that an agreement has been established, in S150 the processor 210 displays the model numbers of the subscription cartridges 50 on the display 240 (see S11 of FIG. 2 and FIG. 4C). In S160 the processor 210 determines whether subscription cartridges 50 are currently mounted in the cartridge holder 51 based on cartridge information acquired through the communication unit 285.

When subscription cartridges 50 are currently mounted in the cartridge holder 51 (S160: YES), in S170 the processor 210 accepts print commands from the user through prescribed operations on the operation interface 250. In other words, in S170 the processor 210 allows image formation with the printer 290 using the subscription cartridges 50 displayed in S150, enabling the user to control the printer 290 of the multifunction peripheral 200 to execute desired printing. The process executed in S140 when the processor 210 reaches a NO determination in S120 and the process executed in S170 when the processor 210 reaches a YES determination in S160 correspond to examples of the printing permission control process. After completing the process in S170, the processor 210 returns to S100 and repeats the above procedure.

When one or more non-subscription cartridges 50 are currently mounted in the cartridge holder 51, that is, one or more normal cartridges 50 or one or more other ink cartridges 50 that are not compatible with the multifunction peripheral 200 are currently mounted in the cartridge holder 51 (S160: NO), in S180 the processor 210 displays a prescribed warning on the display 240, similar to that in S140, indicating that at least on ink cartridge 50 currently mounted in the cartridge holder 51 does not match any one of the ink cartridges 50 whose model numbers were displayed in S150. More specifically, when one or more normal cartridges 50 are mounted in the cartridge holder 51 at this time, the processor 210 may display a warning message indicating that the multifunction peripheral 200 can execute image formation on the printer 290, but the one or more mounted ink cartridges 50 are not subscription cartridges 50. When the ink cartridges 50 currently mounted in the cartridge holder 51 are neither normal cartridges 50 nor subscription cartridges 50, the processor 210 may display a warning indicating that the ink cartridges 50 are incompatible with the multifunction peripheral 200 and that image formation with the printer 290 is impossible.

Unlike in S170, in S180 the processor 210 does not accept print commands from the user through prescribed operations on the operation interface 250 and does not allow image formation with the printer 290 using the one or more normal cartridges 50 mounted in the cartridge holder 51. In other words, the processor 210 prohibits image formation with the printer 290. The process executed by the processor 210 in S180 also corresponds to an example of the warning display process. After completing the process in S180, the processor 210 returns to S100 and repeats the above procedure.

As an alternative for S150, the processor 210 may display model numbers for both normal cartridges 50 and subscription cartridges 50 on the display 240. Subsequently, in S160 the processor 210 determines whether the ink cartridges 50 currently mounted in the cartridge holder 51 are normal cartridges 50 or subscription cartridges 50, i.e., are ink cartridges 50 whose model numbers were displayed in S150. When the mounted ink cartridges 50 are normal ink cartridges 50 or subscription cartridges 50 (S160: YES), the processor 210 executes the process in S170. However, when the ink cartridges 50 currently mounted in the cartridge holder 51 are neither normal cartridges 50 nor subscription cartridges 50, i.e., when other ink cartridges 50 whose model numbers were not displayed in S150 (S160: NO), the processor 210 executes the process in S180.

Effects of the Embodiment

According to the embodiment described above, when a prescribed printing agreement is established, the type-identification information for subscription cartridges 50 supported under the agreement (model numbers in the embodiment) is displayed on the display 240. This display can help prevent the user from accidentally mounting normal cartridges 50, which was used prior to the agreement being established, in the cartridge holder 51, after the agreement has been established. As an alternative to model numbers, the type-identification information may be other suitable type information or the like that directly or indirectly indicates the types of ink cartridges 50, such as destination information specifying the shipping destination (such as a shipping destination region, or a shipping destination country) for the specific model of the multifunction peripheral 200.

A feature of the embodiment is that the information terminal 300 displays the model numbers for the normal cartridges 50 in S3 in conjunction with the multifunction peripheral 200 displaying the model numbers for the normal cartridges 50 on the display 240 in S1. After a printing agreement is established, the information terminal 300 displays the model numbers for subscription cartridges 50 in S13 in conjunction with the multifunction peripheral 200 displaying the model numbers for the subscription cartridges 50 on the display 240 in S11. Thus, when the user attempts to mount ink cartridges 50 based on the display on the information terminal 300, this display can help prevent the user from accidentally mounting the normal cartridges 50, which was used prior to the agreement being established in the cartridge holder 51, after the agreement has been established.

Another feature of the embodiment is that the multifunction peripheral 200 displays the model numbers of the normal cartridges 50 on the display 240 in S1 prior to the printing agreement being established and displays the model numbers of the subscription cartridges 50 on the display 240 in S11 while removing the model numbers of the normal cartridges 50 from the display when a printing agreement is subsequently established. In this way, the multifunction peripheral 200 can prevent the user from seeing the model numbers for the normal cartridges 50 after an agreement has been established, thereby helping to prevent the user from mounting the wrong ink cartridges 50.

Another feature of the embodiment is that permitted use of subscription cartridges 50 predicated on the existence of a printing agreement changes when an agreement is established (or cancelled). That is, the multifunction peripheral 200 prohibits image formation using subscription cartridges 50 before a printing agreement has been established but allows image formation using subscription cartridges 50 after a printing agreement has been established, as described in S140 and S180 of FIG. 5. In this way, the multifunction peripheral 200 can encourage the user to use subscription cartridges 50 after a printing agreement has been established when image formation with the subscription cartridges 50 is possible and can help prevent the user from mounting incorrect ink cartridges 50.

Another feature of the embodiment is that the model numbers displayed for the ink cartridges 50 are linked to the permission to use those ink cartridges 50, as described in S130, S140, S170, and S180 of FIG. 5. That is, image formation with the printer 290 is allowed for cartridges 50 whose model numbers are displayed from among the normal cartridges 50 and the subscription cartridges 50. However, the image formation with the printer is not allowed for ink cartridges 50 whose model numbers are not displayed.

When a printing agreement is established, the multifunction peripheral 200 displays only the model numbers for the subscription cartridges 50, or alternatively displays both the model numbers for the normal cartridges 50 and the model numbers for the subscription cartridges 50. Thus, when the model numbers are displayed only for the subscription cartridges 50, image formation is allowed for the subscription cartridges 50 but not for other ink cartridges 50 (S180). When the model numbers are displayed for both the normal cartridges 50 and the subscription cartridges 50, image formation is allowed using both the subscription cartridges 50 and the normal cartridges 50. In this way, the multifunction peripheral 200 allows at least image formation using subscription cartridges 50 after a printing agreement has been established, thereby encouraging the user to use subscription cartridges 50 and helping to prevent the user from mounting incorrect ink cartridges 50 after the agreement is established.

Another feature of the embodiment is that when a printing agreement concluded as described above is subsequently cancelled, the multifunction peripheral 200 removes the model numbers for the subscription cartridges 50 from the display on the display 240 and displays the model numbers for the normal cartridges 50. Accordingly, once the agreement has been cancelled and the problem of incorrect mounting can no longer occur, the model numbers of the normal cartridges 50 are once again displayed on the display 240 to fulfill the intended function of notifying the user.

Another feature of the embodiment is that the model numbers are displayed for the ink cartridges 50 that are mountable (usable) in the multifunction peripheral 200, and a warning is displayed when different ink cartridges 50 have been mounted (S140, S180). This action can help prevent the user from mounting incorrect ink cartridges 50.

Another feature of the embodiment is that the model numbers for the normal cartridges 50 are printed on a sheet PA when the user operates the "Print" button in the model number display screen 240C displayed on the display 240 (see FIG. 3D). This sheet PA can then be used as a memo when the user goes to a store to purchase the ink cartridges 50, for example.

However, once the user enters a printing agreement as described above, the subscription cartridges 50 that can be used under this agreement differ in type from the normal cartridges 50 and in most cases are shipped to the user by the manufacturer, for example. Consequently, the user would not be expected to go to a store to purchase these subscription cartridges 50. Therefore, as described above with reference to FIG. 4C, the multifunction peripheral 200 stops receiving operations of the "Print" button once an agreement has been established, thereby preventing a function that is essentially no longer needed from being needlessly provided.

Another feature of the embodiment is that the multifunction peripheral 200 displays the model numbers for the subscription cartridges 50 on the display 240 as a means for representing establishing the printing agreement after the agreement start information is received from the information management server 100. Accordingly, the multifunction peripheral 200 can promptly prevent the user from mounting incorrect ink cartridges 50 after the printing agreement has been established.

Modifications

While the disclosure has been described in detail with reference to the specific embodiment thereof, it would be apparent to those skilled in the art that various changes and modifications may be made therein without departing from the scope of the invention. In the following modifications, like parts, components, processes are designated with the same reference numerals to avoid duplicating description.

(1) MODIFYING THE DISPLAY MODE AFTER TRANSMITTING AN AGREEMENT ACCEPTANCE NOTIFICATION TO THE INFORMATION MANAGEMENT SERVER

Figure 7:
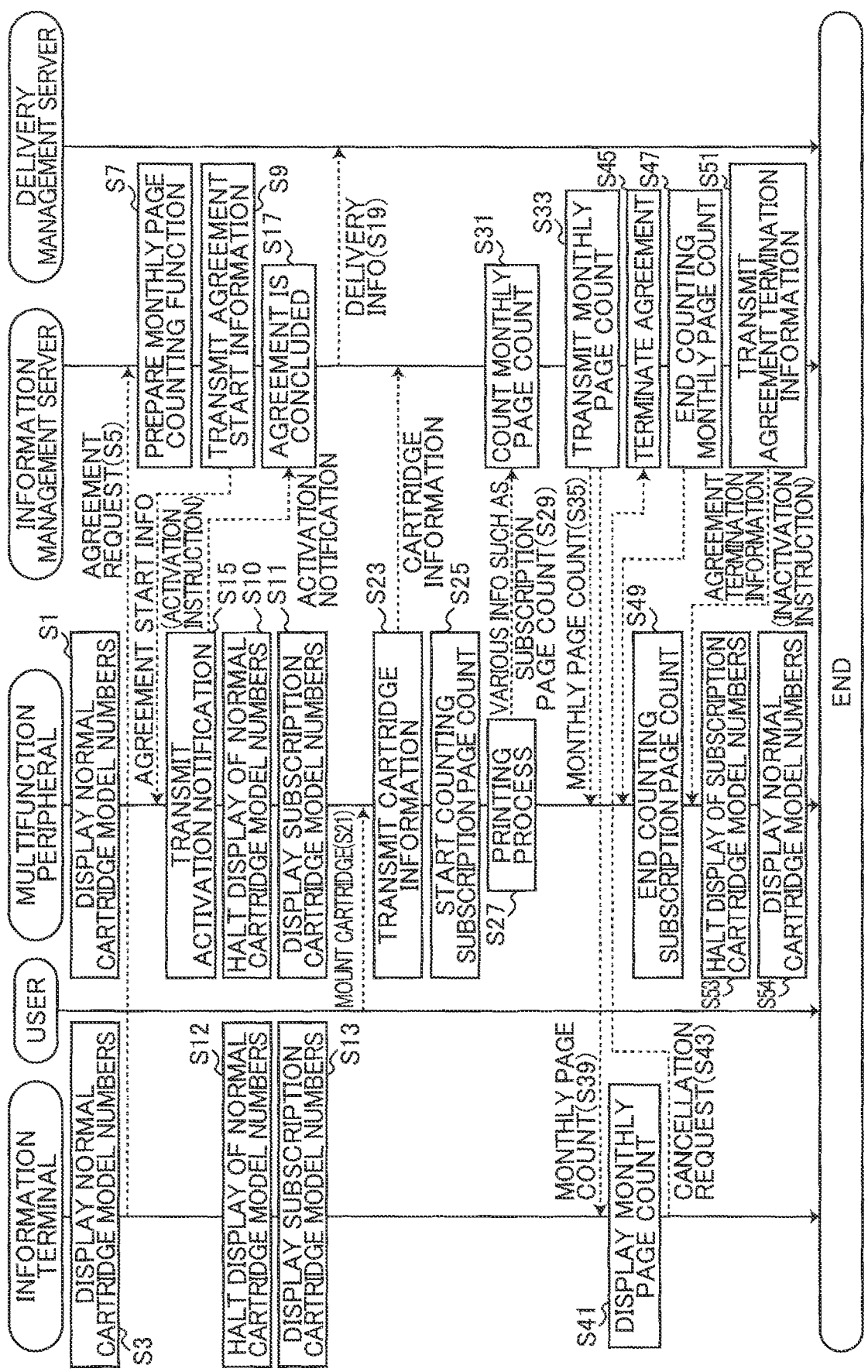
FIG. 7 is a sequence chart illustrating processes executed by the information terminal, the multifunction peripheral, the information management server, and the delivery management server according to a variation (1)

The sequence chart in FIG. 7, which corresponds to FIG. 2 described in the embodiment, shows a variation (1) of the process executed by the multifunction peripheral 200, the information management server 100, the delivery management server 400, and the information terminal 300.

In the variation shown in FIG. 7, steps S10, S11, S12, and S13 are executed after step S15. That is, after the multifunction peripheral 200 receives the agreement start information from the information management server 100 in S9, in S15 the multifunction peripheral 200 transmits an agreement acceptance notification to the information management server 100 and in S17 the information management server 100 receives this notification. Subsequently, in S10 the multifunction peripheral 200 halts the display of the model numbers for the normal cartridges 50 on the display 240, and in S11 displays the model numbers for subscription cartridges 50. In conjunction with this process, in S12 the information terminal 300 halts the display of the model numbers for the normal cartridges 50 and in S13 begins displaying the model numbers for the subscription cartridges 50. The remainder of the process is identical to that in FIG. 2 and will not be described here.

According to the present variation, after the multifunction peripheral 200 receives the agreement start information for the printing agreement from the information management server 100 and transmits a response to the information management server 100, that is, after the printing agreement is clearly established, the model numbers for the subscription cartridges 50 are displayed on the display 240 of the multifunction peripheral 200 (S11). This process can help prevent the user from mounting incorrect ink cartridges 50.

(2) DISPLAYING MODEL NUMBERS FOR BOTH NORMAL CARTRIDGES AND SUBSCRIPTION CARTRIDGES AFTER AN AGREEMENT IS ESTABLISHED

Figure 8A:
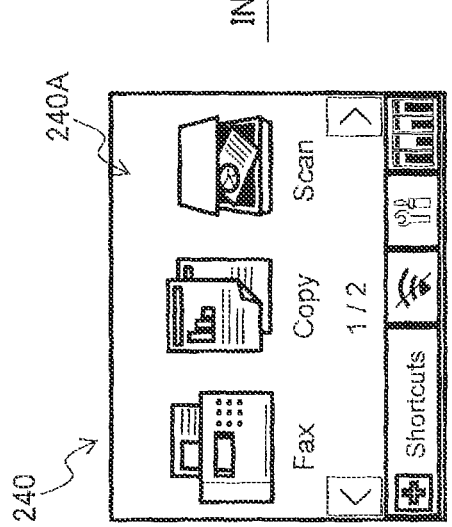
FIGS. 8A-8C are explanatory diagrams illustrating operations and transition to display model numbers of normal cartridges and subscription cartridges on the display according to a variation (2)
Figure 8B:
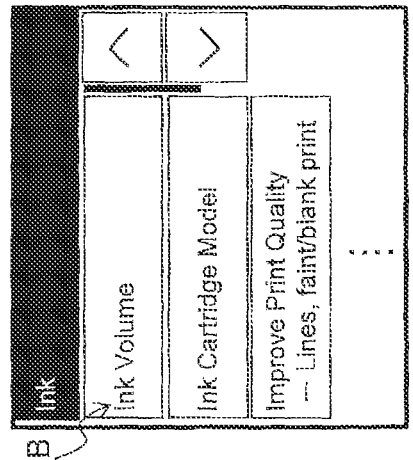
Figure 8C:
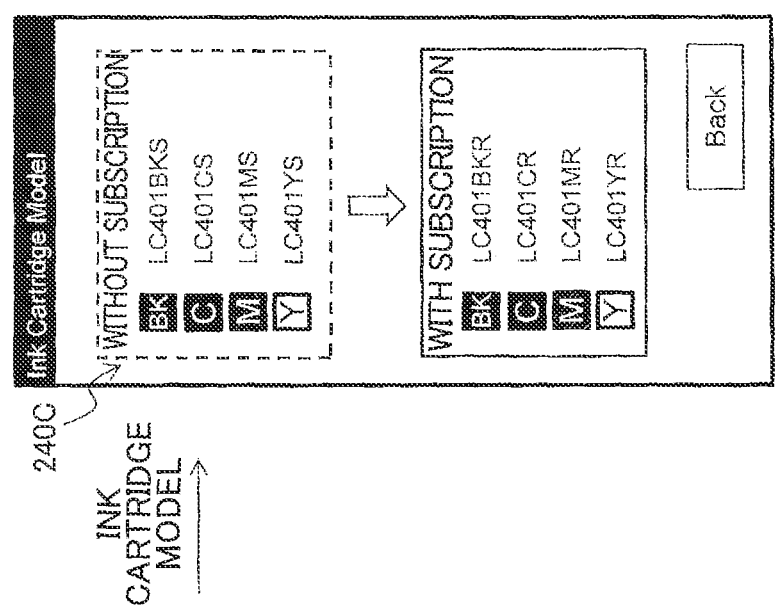

Next, the operations and sequence of screens for displaying the model numbers of the normal cartridges 50 on the display 240 of the multifunction peripheral 200 according to a variation of the embodiment will be described with reference to FIGS. 8A-8C, which respectively correspond to FIGS. 3A-3C described above. The model number display screen 240C shown in FIG. 8C is displayed on the display 240 after the user operates the "Ink" icon in the initial screen 240A to display the settings screen 240B and subsequently operates the "Ink Cartridge Model" button in the settings screen 240B, as shown in FIGS. 8A and 8B, which are identical to FIGS. 3A and 3B.

In addition to the item name "Ink Cartridge Model" described earlier, the model number display screen 240C in FIG. 8C displays the model numbers for the normal cartridges 50 compatible with the multifunction peripheral 200 in the upper section of the display and displays the model numbers for the subscription cartridges 50 covered under the printing agreement and compatible with the multifunction peripheral 200 in the lower section of the display below the down arrow.

As in FIG. 3C, the model names for the normal cartridges 50 displayed in the upper section of the screen are "LC401BKS," "LC401CS," "LC401MS," and "LC401YS" corresponding to black ink, cyan ink, magenta ink, and yellow ink, respectively. The note "Without subscription" is added above these model numbers to indicate that the model numbers represent normal cartridges 50 used when a printing agreement has not been established. The added note may be "Pre-agreement" to indicate that the model numbers represent normal cartridges 50 used prior to a printing agreement being established. The display including this note is an example of the first display mode.

As described above, the model numbers for subscription cartridges 50 displayed in the lower section are "LC401BKR," "LC401CR," "LC401MR," and "LC401YR" that correspond to black ink, cyan ink, magenta ink, and yellow ink, respectively. The note "With subscription" is added above these model numbers to indicate that the model numbers represent subscription cartridges 50 used once a printing agreement has been established. The added note may be "Post-agreement" to indicate that the model numbers represent subscription cartridges 50 used once a printing agreement has been established. This display including the note is an example of the second display mode.

Note that rather than adding different notes to the model numbers for the normal cartridges 50 and the model numbers for the subscription cartridges 50 as described above, another suitable difference in display modes may be applied, such as displaying one in bold and the other in fine (or normal) print or displaying one darker and the other lighter. In any case, the display mode for the normal cartridges 50 is an example of the first display mode, while the display mode for the subscription cartridges 50 is an example of the second display mode.

Figure 9:
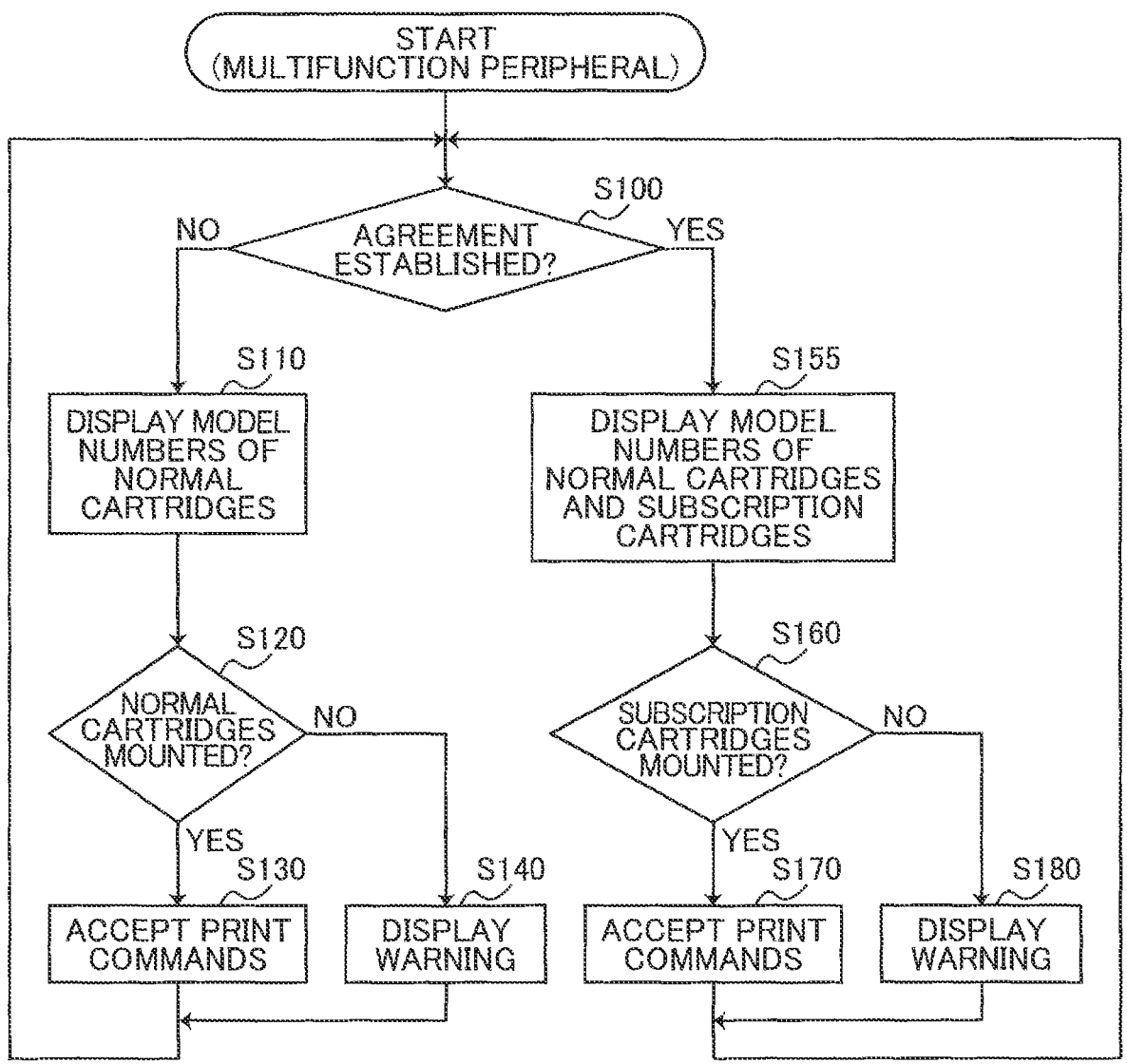
FIG. 9 is a flowchart illustrating display control executed by the multifunction peripheral according to a variation (2)

Next, the control procedure executed by the processor 210 of the multifunction peripheral 200 according to the present variation will be described with reference to the flowchart in FIG. 9, which corresponds to FIG. 5 described above. In FIG. 9, step S155 is provided in place of step S150 in FIG. 5. Thus, in a case that the processor 210 determines in S100 that a printing agreement has been established (S100: YES), the processor 210 advances to the new step S155. In S155 the processor 210 displays the model numbers for both the normal cartridges 50 and the subscription cartridges 50 on the display 240 (see FIG. 8C). Thereafter, as in FIG. 5 of the embodiment, the processor 210 determines in S160 whether the subscription cartridges 50 are currently mounted in the cartridge holder 51. When the normal cartridges 50 or other ink cartridges 50 incompatible with the multifunction peripheral 200 are currently mounted in the cartridge holder 51 (S160: NO), the processor 210 displays the prescribed warning in S180. However, when the subscription cartridges 50 are currently mounted in the cartridge holder 51 (S160: YES), the processor 210 does not display the warning and accepts printing commands from the user in S170.

According to the present variation, the processor 210 continues displaying the normal cartridges 50 on the display 240 after a printing agreement is established while newly displaying the model numbers for the subscription cartridges 50. At this time, the processor 210 adds the note indicating that the model numbers of the normal cartridges 50 are not supported under the printing agreement, and the note indicating that the model numbers of the subscription cartridges 50 are supported under the printing agreement (see FIG. 8C). This method ensures the user will recognize that model numbers displayed for the normal cartridges 50 are not supported under the printing agreement, thereby helping prevent the user from mounting incorrect ink cartridges 50 after a printing agreement has been established.

According to the present variation, the multifunction peripheral 200 displays both the model numbers of the normal cartridges 50 and the model numbers of the subscription cartridges 50 after the printing agreement has been established. Thereafter, the multifunction peripheral 200 does not display the warning when the subscription cartridges 50 are mounted in the cartridge holder 51 (see S170 of FIG. 9), but displays the prescribed warning when ink cartridges 50 other than subscription cartridges 50 are mounted in the cartridge holder 51 (S180 of FIG. 9). In this way, the multifunction peripheral 200 can help prevent the user from mounting incorrect ink cartridges 50. Thus, depending on the determination in S160, the multifunction peripheral 200 can print in a case that the subscription cartridges 50 are mounted, but issues the warning in a case that the normal cartridges 50 are mounted. However, the multifunction peripheral 200 may still allow printing to continue using normal cartridges 50 even while the agreement is in effect. That is, in some cases the user may need to print using normal cartridges, such as when the subscription cartridges 50 have not yet been delivered to the user or when the user does not wish to execute printing that will increase the cumulative page number billed under the printing agreement. In order to support such situations, the multifunction peripheral 200 may perform control to allow printing while displaying the prescribed warning in a case that normal cartridges 50 are mounted in the cartridge holder 51 while an agreement is in effect. The multifunction peripheral 200 may also allow the use of cartridges whose model numbers are not displayed while an agreement is in effect.

(3) ALLOWING OPERATION OF THE "PRINT" BUTTON AFTER A PRINTING AGREEMENT IS ESTABLISHED (FIRST EXAMPLE)

Figure 10A:
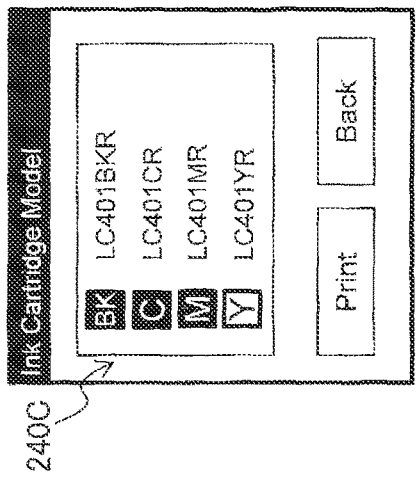
FIGS. 10A-10C are explanatory diagrams illustrating behavior of the display in a case that "Print" button in a model number screen is operated after the agreement has been established according to a variation (3)

In the present variation (3), after a printing agreement is established, the model number display screen 240C shown in FIG. 10A is displayed on the display 240 through operations similar to those described with reference to FIG. 4C in the embodiment. The model number display screen 240C of the present variation includes the "Print" button described in FIG. 3C together with the model numbers "LC401BKR," "LC401CR," "LC401MR," and "LC401YR" for ink colors of the subscription cartridges 50 and the "Back" button shown in FIG. 4C.

Figure 10B:
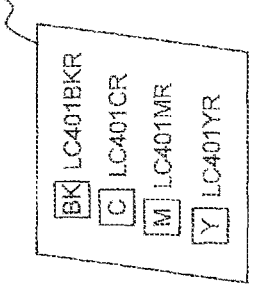

When the user operates the print button, the processor 210 controls the printer 290 to print the displayed content in the model number display screen 240C (i.e., the model numbers of the subscription cartridges 50) on a paper. As shown in FIG. 10B, the model numbers "LC401BKR," "LC401CR," "LC401MR," and "LC401YR" for black ink, cyan ink, magenta ink, and yellow ink, respectively, are printed on the sheet PA in this example.

Figure 10C:
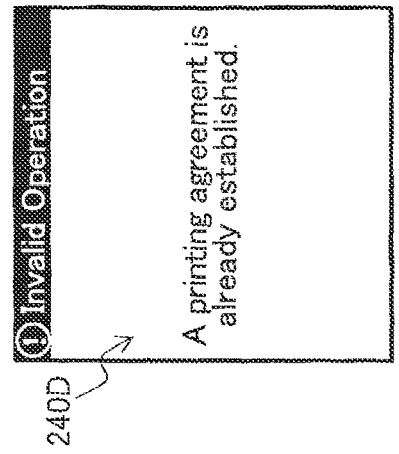

As an alternative, the processor 210 may display a warning screen 240D on the display 240 when the user operates the "Print" button, as illustrated in FIG. 10C. The warning screen 240D includes the item name "Invalid Operation" and the warning "A printing agreement is already established" indicating that a printing agreement has been established. The warning may be "Cartridges are already provided under the subscription". Note that content equivalent to this warning message may instead be printed on the sheet PA.

In each of the examples described above, the operation of the "Print" button is an example of the prescribed operation, and the process executed by the processor 210 when the button is operated is an example of the notification process.

When the user operates the print button before a printing agreement has been established in this variation, the multifunction peripheral 200 prints the model numbers for the normal cartridges 50 on the sheet PA, as described in the embodiment with reference to FIG. 3D. In this way, the sheet PA can be employed as a memo when the user goes to the store to purchase ink cartridges 50, for example.

However, when the user operates the "Print" button after a printing agreement has been established, the multifunction peripheral 200 either prints the model numbers of the subscription cartridges 50 on the sheet PA (FIG. 10(b)) or displays the warning screen 240D on the display 240 with a warning indicating that the multifunction peripheral 200 is under contract. This method can reliably prevent the user from mounting incorrect ink cartridges 50.

(4) ALLOWING OPERATION OF THE "PRINT" BUTTON AFTER A PRINTING AGREEMENT IS ESTABLISHED (SECOND EXAMPLE)

Figure 11A:
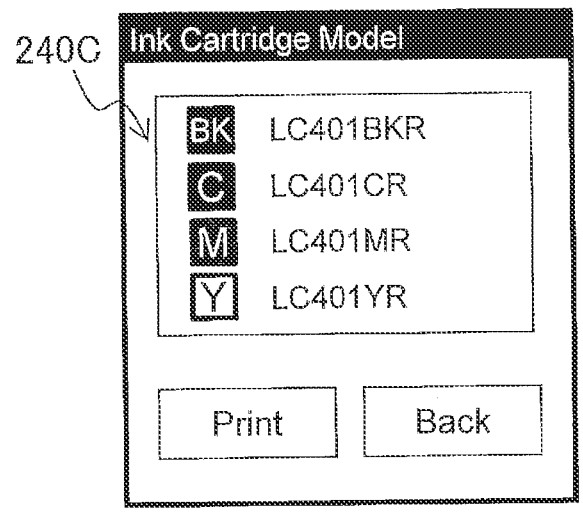
FIGS. 11A and 11B are explanatory diagrams illustrating behavior of the display in a case that "Print" button in a model number screen is operated after the agreement has been established according to a variation (4).

In this variation, after a printing agreement has been established, the model number display screen 240C shown in FIG. 11A is displayed on the display 240 through operations performed by the user, similarly to those described in the embodiment with reference to FIG. 4C. The model number display screen 240C in this variation includes: the model numbers "LC401BKR," "LC401CR," "LC401MR," and "LC401YR" for subscription cartridges 50 containing respective ink colors; the "Back" button; and the "Print" button, similarly to FIG. 10A.

Figure 11B:
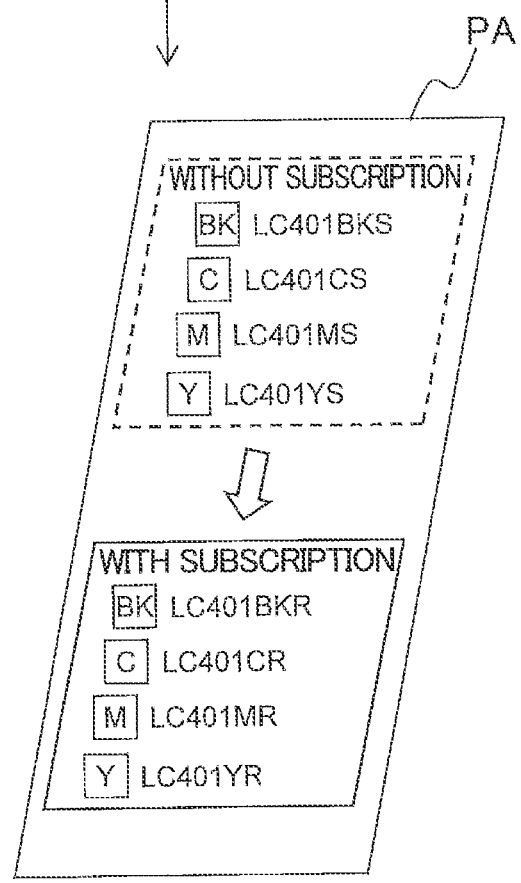

When the user operates the "Print" button, the processor 210 controls the printer 290 to print model numbers for both the normal cartridges 50 and the subscription cartridges 50 on a paper, as illustrated in FIG. 11B. That is, the multifunction peripheral 200 prints the model numbers for the normal cartridges 50 compatible with this multifunction peripheral 200 in the upper section of the sheet PA and prints the model numbers for the subscription cartridges 50 covered under the printing agreement and compatible with the multifunction peripheral 200 in the lower section of the sheet PA beneath the down arrow. The process in which the processor 210 controls the printer 290 to print on the sheet PA is an example of the second printing process.

The model numbers displayed in the upper section for the normal cartridges 50 are "LC401BKS," "LC401CS," "LC401MS," and "LC401YS" corresponding to black ink, cyan ink, magenta ink, and yellow ink, respectively. In addition, the note "Without subscription" is added above these model numbers to indicate that these model numbers represent normal cartridges 50 to be used before a printing agreement has been established. The added note may be "Pre-agreement"

The model numbers displayed in the lower section for the subscription cartridges 50 are "LC401BKR," "LC401CR," "LC401MR," and "LC401YR" corresponding to black ink, cyan ink, magenta ink, and yellow ink, respectively. Additionally, the note "With subscription" is added above these model numbers to indicate that the model numbers are for subscription cartridges 50 to be used after a printing agreement has been established. The added note may be "Post-agreement".

When the user operates the "Print" button prior to a printing agreement being established in this variation, the multifunction peripheral 200 prints the model numbers for the normal cartridges 50 on the sheet PA. In this way, the sheet PA can be employed as a memo when the user goes to the store to purchase ink cartridges 50, for example.

However, when the user operates the "Print" button after a printing agreement has been established as described above, the multifunction peripheral 200 prints the model numbers for both the normal cartridges 50 and the subscription cartridges 50 on the sheet PA. At this time, the multifunction peripheral 200 adds a note next to the model numbers for normal cartridges 50 indicating that the information is for use prior to a printing agreement being established and adds a note next to the model numbers for subscription cartridges 50 indicating that the information is for use after a printing agreement has been established (see FIG. 11B). Accordingly, this process can prevent the user from mounting incorrect ink cartridges 50.

Multifunction Cartridges

Some multifunction peripherals 200 may be capable of using multifunction cartridges 50 that differ from normal cartridges 50 and subscription cartridges 50. Here, a description of multifunction cartridges 50 will be given. The multifunction cartridges 50 are included (often called "bundled") with the multifunction peripheral 200 when a multifunction peripheral 200 is purchased. The multifunction ink cartridges 50 possess different model numbers from normal cartridges 50 and subscription cartridges 50 but can behave like normal cartridges 50 before an agreement has been established and can behave like subscription cartridges 50 after an agreement has been established because the processor 210 treats the multifunction cartridges 50 as the normal cartridges 50 when an agreement has not been established, and treats the multifunction cartridges 50 as the subscription cartridges 50 once an agreement has been established.

The processor 210 does not display the model numbers of the multifunction cartridges 50 in the model number display screen 240C before or after an agreement is established. However, the processor 210 controls the multifunction cartridges 50 to perform printing just like normal cartridges 50 prior to an agreement being established and controls the multifunction cartridges 50 to print just like subscription cartridges 50 after an agreement has been established. Although the model numbers of multifunction cartridges 50 are not displayed in the model number display screen 240C either before or after an agreement has been established, the warning screen 240D is not displayed either before or after an agreement has been established.

Note that the model numbers of the multifunction cartridges 50 may be displayed in the model number display screen 240C prior to an agreement being entered. This will allow the user to recognize that multifunction cartridges can be used without a printing agreement. The model numbers of multifunction cartridges 50 may also be displayed in the model number display screen 240C after an agreement has been established. This will allow the user to recognize that multifunction cartridges can be used as subscription cartridges under the printing agreement. Alternatively, multifunction cartridges 50 may be given the same model numbers as normal cartridges 50. In this case, the processor 210 controls only multifunction cartridges 50 that are bundled cartridges having the same model numbers as normal cartridges 50 to behave as subscription cartridges 50 after an agreement has been established.

(5) OTHER VARIATIONS

As described above, there are two types of ink cartridges 50 compatible with the multifunction peripheral 200, one is the subscription cartridges 50 covered under a printing agreement and normal cartridges 50 not covered under a printing agreement and another is the normal cartridges 50 not covered under a printing agreement. The examples described above help prevent the user from mounting incorrect ink cartridges 50 by appropriately controlling the display of the model numbers for ink cartridges 50. However, the present disclosure may be applied to cases in which the user enters a plurality of agreements of various formats that require the use of different types of cartridges. For example, the user of the multifunction peripheral 200 may enter an agreement A that employs ink cartridges 50 of type a and an agreement B that employs ink cartridges 50 of type b. Say, for example, that the user first enters agreement A. At this time, the multifunction peripheral 200 displays model numbers for ink cartridges 50 of type a on the display 240. Subsequently, while using ink cartridges 50 of type a, the user enters agreement B. At this time, the multifunction peripheral 200 displays model numbers for ink cartridges 50 of type b on the display 240. In this case, the multifunction peripheral 200 may halt the display of model numbers for ink cartridges 50 of type a, as described in the embodiment, after displaying model numbers for ink cartridges 50 of type b. In the above scenario, the ink cartridges 50 of each type need not be delivered to the user as described in the embodiment, but rather the user may purchase the ink cartridges 50 as usual at a store or the like. These variations can obtain the same effects described in the embodiment.

Further, the sequence charts and flowcharts in FIGS. 2, 5, 7, 9, etc. do not limit the present invention to the steps indicated therein. Steps may be added or deleted, or their order may be rearranged.

Further, the methods according to the embodiment and the variations described above may be used in suitable combinations in addition to those already described.

What is claimed is:

1. A printing device comprising:
   a mount member in which a consumable is capable of being mounted, the consumable being selectable from a first consumable and a second consumable, the second consumable being supported under a prescribed agreement;
   a printer configured to print an image on a printing medium by using the consumable mounted in the mount member; and
   a controller configured to perform:
      a first process to notify of first type-identification information identifying the first consumable; and
      in a case that the prescribed agreement is established, a second process to notify of second type-identification information identifying the second consumable supported under the prescribed agreement, the first type-identification information being different than the second type-identification information,
   wherein in a case that the prescribed agreement is not established, the controller performs the first process to notify of the first type-identification information without notifying of the second type-identification information.

2. The printing device according to claim 1, wherein the first process includes a first display process to display the first type-identification information on a display,
   wherein the second process includes a second display process to display the second type-identification information on the display.

3. The printing device according to claim 1, wherein the first process includes a first printing process to control the printer to print the first type-identification information on the printing medium,
   wherein the second process includes a second printing process to control the printer to print the second type-identification information on the printing medium.

4. The printing device according to claim 1, further comprising a communication interface configured to communicate with a terminal device having a terminal display,
   wherein the first process includes a first terminal notifying process to cause the terminal device to display the first type-identification information on the terminal display,
   wherein the second process includes a second terminal notifying process to cause the terminal device to display the second type-identification information on the terminal display.

5. The printing device according to claim 1, wherein in the case that the prescribed agreement is established, the controller stops performing the first process.

6. The printing device according to claim 1, wherein in the case that the prescribed agreement is established, the controller continues performing the first process to notify of the first type-identification information in a first mode to represent that the first type-identification information is not supported under the prescribed agreement, and performs the second process to notify of the second type-identification information in a second mode to represent that the second type-identification information is supported under the prescribed agreement.

7. The printing device according to claim 1, wherein in the case that the prescribed agreement is not established:
   the controller permits execution of the first process but does not permit execution of the second process; and
   the controller allows the printer to execute printing using the first consumable corresponding to the first process which is currently permitted, and prohibit the printer to execute printing using the second consumable corresponding to the second process which is not currently permitted,
   wherein in the case that the prescribed agreement is established,
   the controller permits execution of one of the second process and a third process, the third process being to notify of both the first type-identification information and the second type-identification information,
   the controller allows the printer to execute printing using a consumable corresponding to one or more processes which are currently permitted from among the second process and the third process, and prohibits the printer from executing printing using a consumable corresponding to a process that is not currently permitted among the second process and the third process.

8. The printing device according to claim 1, wherein in the case that the prescribed agreement is not established, the controller permits execution of the first process but does not permit execution of the second process, and
   wherein the controller is configured to further perform:
      in a case that the controller receives an agreement cancellation notification notifying of cancellation of the prescribed agreement, a resuming process to stop the second process and to resume the first process.

9. The printing device according to claim 8, wherein in the case that the controller receives the agreement cancellation notification, the controller prohibits the printer from executing printing using the second consumable identified by the second type-identification information, and allows the printer to execute printing using the first consumable identified by the first type-identification information.

10. The printing device according to claim 1, wherein in the case that the prescribed agreement is established, the controller performs both the first process and the second process,
wherein the controller is configured to further perform, in the case that the prescribed agreement is established and a consumable different from the second consumable is mounted in the mount member, notifying of a prescribed warning,
wherein in the case that the prescribed agreement is established and the second consumable is mounted in the mount member, the controller does not notify of the prescribed warning.

11. The printing device according to claim 1, further comprising an operation interface,
wherein the first process is performed in the case that the prescribed agreement is not established,
wherein the first process includes a first printing process to control the printer to print the first type-identification information on the printing medium in response to receiving a prescribed operation through the operation interface,
wherein in the case that the prescribed agreement is established, the controller stops receiving the prescribed operation via the operation interface.

12. The printing device according to claim 1, further comprising an operation interface,
wherein the first process is performed in the case that the prescribed agreement is not established,
wherein the first process includes a first printing process to control the printer to print the first type-identification information on the printing medium in response to receiving a prescribed operation through the operation interface,
wherein the second process includes a notification process in response to receiving the prescribed operation, the notification process being to perform at least one of: controlling the printer to print the second type-identification information on the printing medium; and displaying on a display information indicating that the prescribed agreement is established.

13. The printing device according to claim 1, further comprising an operation interface,
wherein the first process is performed in the case that the prescribed agreement is not established,
wherein the first process includes a first printing process to control the printer to print the first type-identification information on the printing medium in response to receiving a prescribed operation through the operation interface; and
wherein the second process includes a second printing process to control the printer to print on the printing medium the first type-identification information with a first note and the second type-identification information with a second note in response to receiving the prescribed operation, the first note indicating that the first type-identification information corresponds to a situation that the prescribed agreement is not established, the second note indicating that the second type-identification information corresponds to a situation that the prescribed agreement is established.

14. The printing device according to claim 1, wherein the controller performs the second process when the controller receives a completion notification from a server, the completion notification indicating a completion of establishing the prescribed agreement.

15. The printing device according to claim 1, wherein the controller performs the second process after the controller receives a completion notification from a server and transmits a response to the completion notification to the server, the completion notification indicating a completion of establishing the prescribed agreement.

16. The printing device according to claim 1, wherein the first type-identification information is a first model number of the first consumable, and the second type-identification information is a second model number of the second consumable supported under the prescribed agreement, where the first model number and the second model number are different.

17. A non-transitory computer readable storage medium storing a set of program instructions installed on and executed by a computer included in a printing device, the printing device further including: a mount member in which a consumable is capable of being mounted, the consumable being selectable from a first consumable and a second consumable, the second consumable being supported under a prescribed agreement; and a printer configured to print an image on a printing medium by using the consumable mounted in the mount member, the set of program instructions, when executed by the computer, causing the printing device to perform:
a first process to notify of first type-identification information identifying the first consumable; and
in a case that the prescribed agreement is established, a second process to notify of second type-identification information identifying the second consumable supported under the prescribed agreement, the first type-identification information being different than the second type-identification information,
wherein in a case that the prescribed agreement is not established, the first process is performed to notify of the first type-identification information without notifying of the second type-identification information.

18. The non-transitory computer readable storage medium according to claim 17, wherein the first type-identification information is a first model number of the first consumable, and the second type-identification information is a second model number of the second consumable supported under the prescribed agreement, where the first model number and the second model number are different.

19. A non-transitory computer readable storage medium storing a set of program instructions installed on and executed by a computer included in a terminal configured to be connected to a printing device, the printing device being configured to print an image on a printing medium by using a consumable, the set of program instructions, when executed by the computer, causing the terminal to perform:
a first process to notify of first type-identification information identifying a first consumable; and
in a case that a prescribed agreement is established, a second process to notify of second type-identification information identifying a second consumable supported under the prescribed agreement, the first type-identification information being different than the second type-identification information, wherein in a case that the prescribed agreement is not established, the first process is performed to notify of the first type-identification information without notifying of the second type-identification information.

20. The non-transitory computer readable storage medium according to claim 19, wherein the first type-identification information is a first model number of the first consumable, and the second type-identification information is a second model number of the second consumable supported under the prescribed agreement, where the first model number and the second model number are different.

* * * * *